United States Patent Office 2,766,161
Patented Oct. 9, 1956

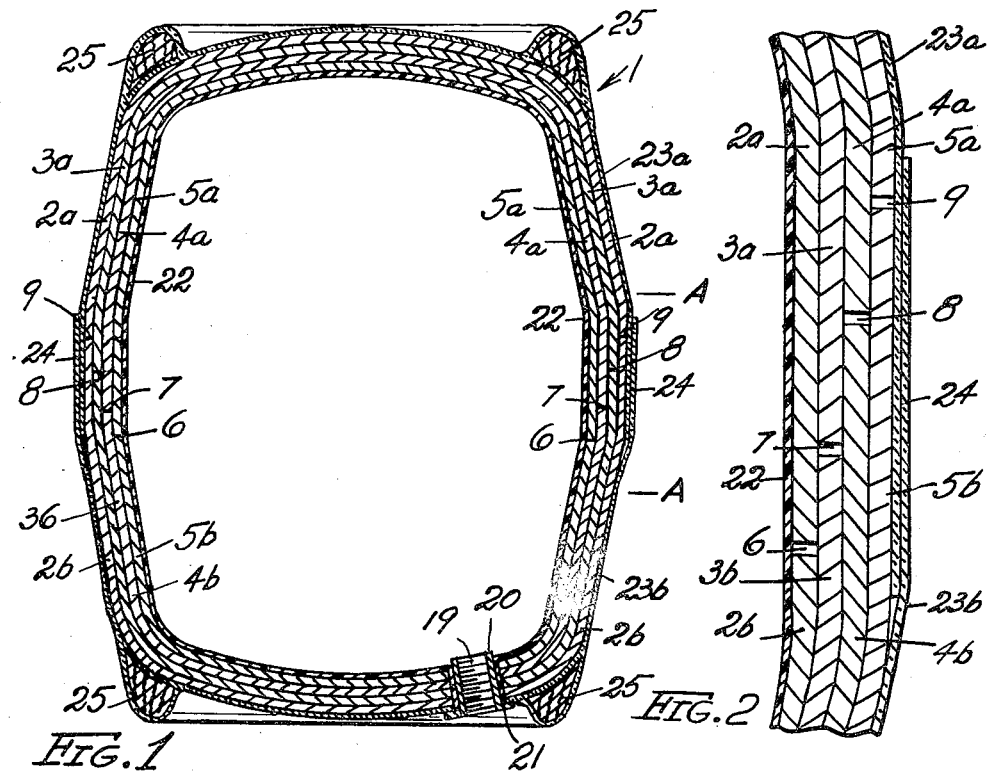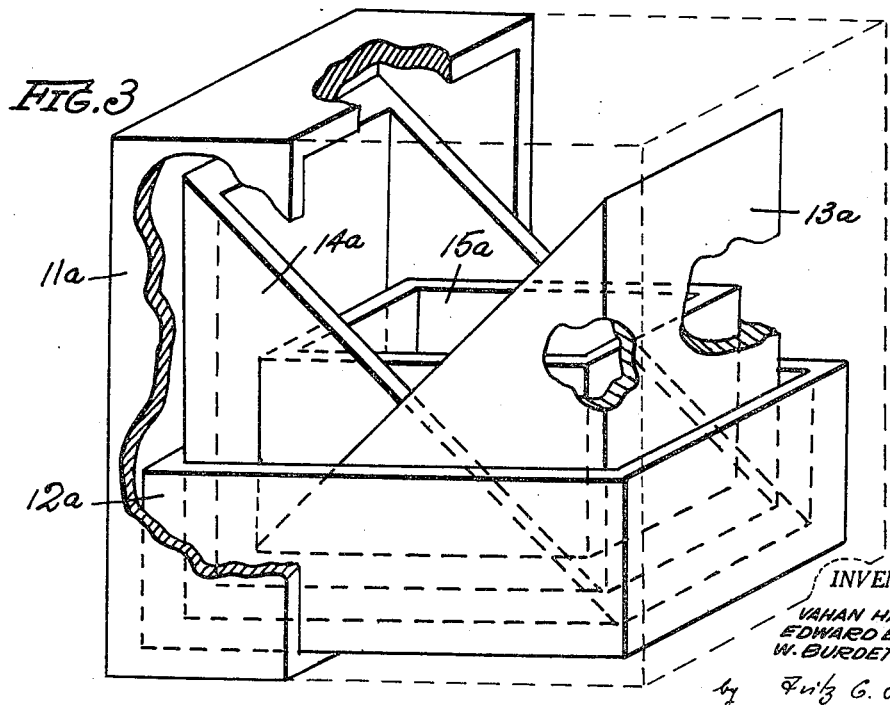

2,766,161

METHOD OF MAKING MULTILAYER FIBROUS CLOSED-END CONTAINERS

Vahan Hagopian, New York, and Edward E. Barth, Larchmont, N. Y., and William Burdette Wilkins, Ridgewood, N. J., assignors, by mesne assignments, to Stella Trust U/A, New York, N. Y., a New York trust Original application October 25, 1951, Serial No. 253,172. Divided and this application March 13, 1953, Serial No. 342,064

8 Claims. (Cl. 154—83)

The invention relates to an improved method of preparing containers and hollow receptacles and is a division of our copending application Serial No. 253,172, filed October 25, 1951, now abandoned.

For the sake of brevity, the type of containers with which our invention is concerned, will be designated as closed-end containers; such containers may be described as having a body portion, a top portion, and a base or bottom portion, said portions enclosing together completely the contents; some suitable means or opening is provided to fill and empty the containers.

Such containers, which may be of square, cylindrical or barrel shape, are used particularly for the storage and shipment of liquids and gases and also of solid substances which have to be enclosed or protected against contact with the atmosphere. They are conventionally made of metal, wood, glass, or ceramics, and it has long been the aim of the art to replace these materials by impregnated fibrous materials, such as impregnated paper or cardboard. Containers molded from such materials would present many important advantages, of which may be mentioned only their low weight, inexpensiveness, high degree of strength, elasticity and resiliency, and their resistance against chemical agents and corrosion as well as against shocks.

The manufacture of such molded fibrous containers has been mostly attempted by a procedure where the body of a tubular container was made separately, e. g. by winding several plies of paper-like material spirally with abutting edges, whereupon the plies and edges were cemented together by molding; afterwards, separate end closures were combined with the tubular bodies in some suitable way.

However, the union of the end closures with the tubular body is a difficult and expensive procedure, and containers of this type have always a region of reduced strength at or near the joining zone of the end closures with the body of the container. This method allows only the manufacture of containers having a tubular body.

In order to avoid these drawbacks, a method was developed to make containers, such as barrels, from cup-shaped elements by assembling such elements with their concave sides in opposed relation with overlapping edges to a rudimentary container, enclosing an elastic bag between said elements, and inflating said bag with heated fluid while exteriorly confining the overlapped edges of the rudimentary container. This method, which is disclosed and claimed in Patent No. 2,460,820 to Vahan Hagopian, one of the applicants in this application, avoids the difficulty of providing separate end closures, which tends to weaken the top and bottom portions of the container.

It is true that the bulge itself formed by the overlapping plies in the method of Patent No. 2,460,820 is strong; however, it has been found that the area above and below the bulge, where the plies bend outwardly to overlap and form the bulge, is considerably reduced in strength because of the stresses imparted by the bending. Further, it is only possible to use very few plies because each subsequent preformed outer ply receives at the overlap a sharper outward bend than the preceding ply in accordance with the bulge already formed, which eventually weakens the outer plies at the bent overlap edges so much that they do no longer increase the overall strength of the structure. In addition, the formation of the bulge does not allow of using a large number of superimposed plies because the overlapping edges of the outermost plies would have to receive too sharp an outward bend.

The object of the invention is to provide a method of making containers of any shape, such as box-like containers or containers having a curved shape like barrels, gas bottles, and the like which, though constructed of a plurality of sections and layers, are free of the recited drawbacks, have a uniform strength throughout, and do not present any points or diameters of reduced resistance along or near the joints of said sections, and in which the end portions form a homogeneous unit with the walls.

Other objects and advantages will become apparent from a consideration of the specification and claims.

The containers or receptacles in accordance with our invention are composed of premolded, substantially self-sustaining blanks of fibrous material. These blanks are premolded to such an extent that they do no longer sweat out any substantial amount of water, or give off substantial amounts of vapor on heating.

A set of at least two such blanks of suitable size and shape, when placed in edge-to-edge relationship, defines the sections of one complete individual layer of the container.

The whole container is composed of a plurality of such individual superimposed layers. The joints of the sections of each layer are disposed in another plane than the joints in the adjoining layers.

The blanks are shaped from a fibrous material in sheet or slurry form, which may already contain a suitable adhesive or cementing agent, such as a thermosetting resin, and are molded prior to the assemblage of the containers. The methods of drawing such blanks to shape, and suitable fibrous and impregnating materials are well known in the art, and are described, for instance, in Patent No. 2,460,820, and in the copending patent application, Serial No. 65,629, filed December 16, 1948, of Vahan Hagopian, now Patent No. 2,620,963. The characteristic feature of our new container is that each layer is originally quasi an individual container comprised of at least two premolded sections or blanks, wherein the thickness of each layer is not increased, or at least is not increased by more than about 6 to 7 percent, at the joints of the sections, and where the superimposed sections of the composite layers differ either in extension or in their relative position. In this way, it is automatically ensured that the joints in one layer lie in a different plane than the joints in the adjoining layers and that the finished container has no weak areas due to superimposed joints or bends.

After the various layers have been assembled in this manner in superimposed relationship to form a structure which in view of the use of substantially rigid premolded blanks is already self-supporting, said structure is subjected to a treatment which cements the sections of each layer and the individual layers to each other so as to obtain the finished unitary integral container.

An embodiment of our invention consists in enclosing an inflatable bag in two complemental sections forming the inner-most layer of a container, placing the sections of the next layer upon said inner layer so that the butt joints of the two layers are in different planes and successively building up as many layers as are desired. One section of each layer must, of course, have an opening at a suitable place, and the openings of the superimposed sections must register to form together a conduit which makes it possible to supply fluid to the bag and which, in the finished container, will form the opening for introducing and withdrawing the contents of the container. The assembled structure is then placed into an outer mold and pressure is applied to the bag which forms the inner mold.

In most cases, the molding process will be carried out at an elevated temperature and the necessary pressure and heat will depend on the specific binder or thermoresponsive resin used and on the desired strength of the container. The inflated bag may be withdrawn through the opening after the termination of the molding operation, or if constructed of a suitable material, may serve to form a permanent lining which locally adheres to, or is completely united with, the inner wall of the container.

The container may also be assembled by first telescoping pre-formed successive sections of at least the two innermost layers into each other, thereby forming a seating for the inflatable bag, and subsequently placing the opposite sections of the successive layers in edge-to-edge relationship to said first sections, whereby the sections of each layer must form a seam disposed in a plane not coinciding with the plane of the seams of the adjoining layers.

Though we prefer to use an inner mold, like an inflatable bag, for subjecting the container structure to pressure against the outer mold, this is not a necessary feature of our invention. When a substantially fluid-tight outer mold is used, we may omit the inflatable bag entirely and apply the pressure by directly injecting gas, steam, or another fluid under pressure, into the interior of the rudimentary container placed into the outer mold.

It should be noted that the term "butt joint" is used herein with emphasis on its negative definition as a joint not increasing locally either the thickness of each individual layer or the thickness of the whole structure, in contradistinction to the overlap joints of Patent No. 2,460,820. However, the term "butt joint" does not require that the edges of the complementary sections are actually abutting; it is sufficient that these edges lie in substantially the same plane and they may be connected by the binding agent. The overall strength of the structure is determined by the bonding of the superimposed sections to each other—as will be explained more in detail on consideration of the drawings—and by the lack of any strength-decreasing bends near the joints. Therefore, long scarf joints may under certain circumstances also be used, provided they satisfy the outlined condition of not increasing the thickness of the layer at the joint by more than 6 to 7 percent or decreasing the strength of the structure in the area surrounding the joint.

In the foregoing description of the novel containers we have stated that the individual layers comprising the container are conforming in shape and that their sections are joined so as to avoid any irregularities in the walls which might produce areas of reduced strength. However, it is to be understood that this condition must be fulfilled only by the inner layers forming the container proper and that the outermost layer or layers may have quite a different shape and may be provided with overlap joints and/or projections, which may serve as protecting staves or rings or for decorative purposes. Such projections are completely independent of the formation of the joints of the inner layers, which are so formed and located as not to interrupt the even and smooth contour of the walls.

Though the successive layers of the container proper will be generally of substantially the same thickness, this is not a necessary feature of our invention and, for instance, the innermost or outermost layers may be made of stronger preforms than the intermediate layers.

Our method may be applied to the manufacture of containers of any type with flat or concave or convex top and bottom ends. The vertical walls of the container body may be straight or also curved to form a keg or barrel. In horizontal cross-section, the containers may be circular, elliptical, rectangular, or any polyhedral shape desired.

For a more complete understanding of the invention, reference may be had to the accompanying drawings, in which:

Figure 1 is a vertical section through a barrel made in accordance with the invention;

Fig. 2 shows the portion A—A of Fig. 1 on an enlarged scale to illustrate the arrangement of the joints;

Fig. 3 is a perspective view of a box-like container, parts broken away, to illustrate various arrangements of premolded sections and joints.

Referring to the drawings, numeral 1 designates a container according to our invention in form of a barrel composed of four layers formed of premolded complementary cup-shaped nested sections. The sections at one end are designated 2a, 3a, 4a, and 5a, and those at the other end are designated 2b, 3b, 4b, and 5b. As shown in Fig. 1, complementary cup-shaped sections 3a, 4a, and 3b, 4b respectively, constitute the intermediate layers, and complementary sections 2a and 2b constitute the inner layer. The layers form butt joints 6, 7, 8, and 9 in different planes, which joints are parallel to each other.

Though we may trim the edges of the cup-shaped sections, we have found that in multi-layer containers a close fitting of the edges is not necessary and that containers of satisfactory strength are obtained provided that the superimposed sections are firmly united by a binder. The axial depths of the superimposed sections must vary so that the edges of the superimposed sections project different distances axially with the sections of the complementary nested set projecting in the opposite directions, so that joint 6 is displaced axially of the container from joint 7 formed by the edges of intermediate sections 3 and 3b, and joints 6 and 7 are staggered. Similarly, joint 8 formed by the edges of sections 4a and 4b is staggered with respect to the joints 6, 7, and 9 of the other layers. Inasmuch as joints 6, 7, 8, and 9 are butt joints and the sections 2a to 5b have each a uniform thickness throughout, the thickness of the container 1 is not increased at any cross section of its circumference, notwithstanding that the sections of adjacent layers overlap each other by reason of the staggered joints.

It will be seen from an inspection of the drawing that due to the staggered joints and to the absence of any abrupt bends, the container has a uniform strength over its whole extension. Even though the edges of the complemental sections be not joined at all, the tensile stresses are taken up in each cross section by $n-1$ layers, $n$ being the total number of the layers.

The premolded sections of the container are prepared by conventional methods. They may be formed initially of feltable fibrous material such as paper stock or other vegetable fibers, including but not limited to hemp, jute, cotton, flax, and the like; animal fibers, such as wool and hair generally; synthetic fibers, such as rayon, polyamides, glass, and the like, or mixtures of such vegetable, animal, and synthetic fibers. Such fibers suspended in liquid or air may be felted to shape by a suction felting process on a foraminous form by a conventional vacuum process well known in the paper-making and hat-making arts.

As an example, kraft paper stock may be used and admixed in the pulp beater with from 5 to 20 percent by weight of a compatible adhesive material. Advantageously, about 10 percent by weight of a butadiene copolymer, or a vinyl chloride copolymer may be employed, or an equivalent material like cellulose acetate butyrate or one of the suitable phenolic or urea thermosetting resins generally available on the market. The thermoplastic or thermosetting adhesive resin may be added to the pulp in the beater to preclude delamination within the preforms, since that may occur if the pulp is not thoroughly impregnated with the uncured resin, and such impregnation enhances the hardness and toughness of the finished product.

The rudimentary felt-like blanks are then molded in a known manner to the configuration and dimensions of the sections used for assembling the container.

Before assembly, one set of the superimposed sections, for instance the lower set, is provided with registering openings 19 in which a fitting or nipple 20 is provided, to the inner end 21 of which may be cemented the mouth of an inflatable bag 22, formed for instance of "Vinylite," "Pliofilm," natural or synthetic rubber, or the like. After the assembly of the four nested sections 2b–5b with interposed binding agent, the fitting 20 and bag 22, the second set of nested sections 2a–5a is assembled in that order over the bag 22 after the outer surfaces of sections 2a, 3a, and 4a or the inner surfaces of sections 3a, 4a, and 5a, or both, have been coated with the aforementioned thermoresponsive bonding material. In addition also the edges of these sections may be coated with the bonding material so that they will be united with the edges of the lower set of sections to form the joints 6, 7, 8, and 9, when the bonding material is cured. This coating of the edges can be omitted as the cohesion of the joints is of minor importance anyhow and as the necessary binder can be furnished under suitable conditions by the flow of the resin in the assembling step.

The whole assemblage is then bonded together to a unitary structure in a suitable form or die, which may be similar to that described in Patent No. 2,460,820, by applying pressure and curing the bonding resin.

Because the sections are premolded to accurate shape and are precompressed, the pressure need be only great enough to press them against each other while the interposed resin sets and, preferably, is in the order of 50 pounds per square inch, depending upon the size of the sections, their thickness and other factors. We prefer to apply sufficient heat and pressure to cause some flow of the bonding material in and around the premolded sections so as to ensure a homogeneous wall structure of the container.

If the bag 22 is to form the permanent liner of the finished container, the inner surfaces of the inner sections 2a and 2b, or the outer surface of the bag, or both, may be coated with a suitable adhesive such as the butadiene-acrylonitrile copolymer sold by the B. F. Goodrich Chemical Co. under the trade-name "Hycar" 1502 which, when heated, bonds the outer surface of the bag 22 to the inner surface of the inner layer constituted by the sections 2a and 2b. Alternatively, the bag 22 may be made of a thermoplastic resin which heat softens at the temperature employed, and thus binds itself to the interior of the container shell. If the bag 22 is not required to form the liner of the container, it may be withdrawn through the opening 19 and the interior of the container may be lined with a suitable impervious resin or other coating material, depending on the intended contents of the finished container.

In the foregoing, we have described the assemblage of the container by telescopically nesting the sections of each portion into each other to form a cup-like structure and then combining said cups. This kind of assemblage results in containers where all joints are located in parallel planes.

Another kind of assemblage consists in building up the container in successive layers. The innermost layer is formed of at least two preformed sections, enclosing the inflatable bag, when such a bag is used, before placing said sections in edge-to-edge relationship; a binder may be applied to the edges. On this first layer which forms a one-layer container, is then placed a section of the next layer after binder has been applied to its inner surface and/or to the outer surface of the first layer. Then the complementary section or sections are added to complete the second layer, also after the binder has been interposed. The sections of the second layer may have a similar shape as the sections of the first layer or they may have a completely different shape, provided that placed together they form a complete second layer of the container. The only conditions according to the invention are that the joints of the second layer are not located in the same plane as the joints of the first layer and that the joints do not produce any projections or bends in the walls of the container. Subsequently, as many layers are assembled in the same way one upon the other as are desired for the container. As described for the first mode of assemblage, registering openings have to be provided in the superimposed sections to allow insertion of the nipple for supplying the internal pressure. Finally, the assembly is inserted in the mold or die and the bag is inflated to unite the sections and layers to an integral unit.

Fig. 3 illustrates the assemblage of a box-like container according to our invention in which the sections of the superposed layers are joined partly along lines parallel to the walls and partly diagonal thereto and where the joints are always arranged in different planes. It will be obvious to those skilled in the art that an infinite number of combinations and permutations of this kind is possible, using the principle of our invention. For the sake of clarity, Fig. 3 does not show complete layers nor the joints but always only one section of each layer.

11a designates a section of the outermost layer, which section is about one third of the whole layer; the corresponding section which takes up about two thirds of the layer, is not shown. The next inner layer is arranged so that the joint of the sections forms a right angle with the joint of the sections of the outer layer; only section 12a of said inner layer is shown. The next two layers are composed of sections diagonally joined in opposite directions, as shown by the sections 13a and 14a. The sections of the innermost layer 15 are arranged in the same general way as the second layer (section 12a) so that the joints of the two layers are parallel but in different planes.

When a binding agent is interposed between the layers and the assembly is bonded, a solid box-like container of uniform strength throughout is obtained.

Wear-resistant or protective coverings may be applied to the outside of the container, for instance if it is to be used as a shipping container, which coverings or enclosures may have the same general shape and form as the container proper or may be quite different therefrom.

Fig. 1 shows, by way of example, a glass cloth covering for a barrel which is formed of two cups 23a and 23b composed of glass fiber fabric impregnated with a suitable binder. The interior surfaces of the glass cloth cups may be coated with the same or another binder, for instance with polyester resin 4129 as marketed by the American Cyanamid Company and a suitable catalyst, for instance a peroxide, so that they are bonded to the plies 5a and 5b, and their edges bonded at 24 simultaneously with the uniting of the elements of the entire container. Also, an opening is cut in glass cup 23b in registry with opening 19 in the plies 2a to 5a for receiving the fitting 20.

If the container is required to have chines on each end, chine rings 25 formed of plywood, or the like, may be inserted within the glass cloth cups 23a and 23b and the preforms assembled within said glass cloth cups in the manner shown in Fig. 1 when forming the same. The restraining die is recessed to conform to the glass cloth cups 23a and 23b with the container chine rings 25 in the manner readily understood.

Although some preferred embodiments of the invention are illustrated and described herein, it is to be understood that the invention is not limited thereby, but is susceptible of changes in form and detail within the scope of the appended claims.

What we claim is:

1. A method of making a multilayer fibrous closed-end container of the character described, which comprises the steps of first loosely joining in edge-to-edge relationship a set of premolded self-sustaining complemental sections so as to form a first complete layer of the container, superimposing on said first layer a plurality of subsequent layers assembled from additional sets of such sections joined in planes different from the planes of the joints in the adjoining layers, interposing a binder between the layers, and finally bonding the superimposed layers into an integral structure.

2. A method of making a multilayer fibrous closed-end container of the character described, which comprises the steps of first loosely joining in edge-to-edge relationship a set of premolded self-sustaining complemental sections so as to form a first complete layer of the container, superimposing on said first layer a plurality of subsequent layers assembled from additional sets of such sections joined in planes different from the planes of the joints in the adjoining layers, interposing a binder between the layers, exteriorly confining the rudimentary container thus formed and subjecting it to inner fluid pressure and heat so as to obtain an integral structure.

3. A method of making a multilayer fibrous closed-end container of the character described, which comprises the steps of first loosely joining in edge-to-edge relationship a set of premolded self-sustaining complemental sections around an inflatable bag so as to form a first complete layer of the container, superimposing on said first layer a plurality of subsequent layers assembled from additional sets of such sections joined in planes different from the planes of the joints in the adjoining layers, interposing a binder between the layers, providing a conduit through the layers to the inside of the bag, exteriorly confining the rudimentary container thus formed, and inflating the bag by steam to apply pressure so as to bond the superimposed layers into an integral structure.

4. A method as defined in claim 1, wherein the joints of the superimposed layers are arranged parallel to each other and staggered.

5. A method as defined in claim 1, wherein the joint of a layer is placed at an angle to the joints of the contiguous layers.

6. A method of making a multilayer closed-end container of the character described, which comprises the steps of first loosely joining in edge-to-edge relationship a set of premolded self-sustaining complemental sections containing fibrous material and a binder so as to form a first complete layer of the container, superimposing on said first layer a plurality of subsequent layers assembled from additional sets of such sections joined in planes different from the planes of the joints in the adjoining layers, and finally bonding the superimposed layers into an integral structure.

7. A method of making a multilayer closed-end container of the character described, which comprises forming a plurality of substantially rigid cup-shaped elements of decreasing diameter, nesting at least two of said elements to form a set, joining two sets of nested elements with the edges of corresponding opposing elements in edge-to-edge relation to form superimposed complete layers of the container, arranging the joints in the successive layers in staggered relation with respect to each other, interposing an adhesive between the surfaces of contiguous elements of the superimposed layers, and bonding the rudimentary container thus formed into an integral structure.

8. A method of making a multilayer closed-end container, which comprises forming a plurality of substantially rigid cup-shaped elements, nesting at least two of said elements of differing depths to form a set, assembling two sets of nested elements with the edges of corresponding opposing elements in edge-to-edge relation to form superimposed complete layers of the container with butt joints which are staggered with respect to each other and overlapped by the contiguous elements, interposing an adhesive between the surfaces of the contiguous elements of the superimposed layers, and bonding the rudimentary container thus formed into an integral structure.

References Cited in the file of this patent

UNITED STATES PATENTS

| 1,855,041 | Bodony | Apr. 19, 1932 |
| 2,420,488 | Marhoefer et al. | May 13, 1947 |
| 2,460,820 | Hagopian | Feb. 8, 1949 |
| 2,464,131 | Guyer | Mar. 8, 1949 |